US006998104B2

(12) United States Patent
Tao et al.

(10) Patent No.: US 6,998,104 B2
(45) Date of Patent: Feb. 14, 2006

(54) SYNTHESIS OF MESOPOROUS ZEOLITE

(75) Inventors: Yousheng Tao, Chiba (JP); Hirofumi Kanoh, Chiba (JP); Katsumi Kaneko, Ichihara (JP)

(73) Assignee: Japan Science and Technology Agency, Saitama (JP)

( * ) Notice: Subject to any disclaimer, the term of this patent is extended or adjusted under 35 U.S.C. 154(b) by 0 days.

(21) Appl. No.: 11/007,515

(22) Filed: Dec. 8, 2004

(65) Prior Publication Data

US 2005/0152834 A1 Jul. 14, 2005

Related U.S. Application Data

(63) Continuation of application No. PCT/JP03/06933, filed on Jun. 2, 2003.

(30) Foreign Application Priority Data

Jun. 10, 2002 (JP) .............................. 2002-168268

(51) Int. Cl.
*C01B 39/02* (2006.01)
(52) U.S. Cl. .............................. 423/716; 423/DIG. 22; 502/60
(58) Field of Classification Search ................ 423/716, 423/700, DIG. 22; 502/60
See application file for complete search history.

(56) References Cited

U.S. PATENT DOCUMENTS

2001/0003117 A1 6/2001 Jacobsen et al.
2002/0034471 A1 * 3/2002 Jacobsen et al. ............ 423/700
2002/0192155 A1 * 12/2002 Sterte et al. ................ 423/700

FOREIGN PATENT DOCUMENTS

JP 2001-163699 6/2001

OTHER PUBLICATIONS

Tao et al., "ZSM-5 Monolith of Uniform Mesoporous Channels", Journal of the American Chemical Society, April 23, 2003, vol. 125, No. 20, pp. 6044-6045.
Jacobsen et al., "Mesoporous Zeolite Single Crystals", Journal of the American Chemical Society, Jul. 6, 2000, vol. 122, No. 26, pp. 7116-7117.
Ogura et al., "Formation of Uniform Mesorpores in ZSM-5 Zeolite through Treatment in Alkaline Solution", Chem. Lett., pp. 882-883, (2000).
Suzuki et al., "Change in Pore Structure of MFI Zeolite by Treatment with NaOH Aqueous Solution", Microporous and Mesoporous Materials, 43, pp. 83-89, (2001).

* cited by examiner

*Primary Examiner*—David Sample
(74) *Attorney, Agent, or Firm*—The Webb Law Firm

(57) ABSTRACT

Silicic and aluminum sources as raw materials of zeolite are mixed with carbon aerogel. The mixture is subjected to hydrothermal reaction for synthesis of zeolite, while an aqueous solution, which contains sodium hydroxide and tetrapropylammonium bromide, is being dropped to the mixture. After completion of the hydrothermal reaction, the zeolite-supporting aerogel is washed, dried and then heat-treated for oxidative extrusion of the carbon aerogel. Since the carbon aerogel is used as a template, the synthesized zeolite has the morphology that traces of spheroidal particles of the carbon aerogel remain as mesopores.

3 Claims, 2 Drawing Sheets

100nm angle of diffraction $2\theta$ (degree, Mo-K$\alpha$)

SYNTHESIS OF MESOPOROUS ZEOLITE

CROSS-REFERENCE TO RELATED APPLICATION

This patent application is a continuation of International Patent Application No. PCT/JP03/06933, filed Jun. 2, 2003, and designating inter alia, the United States, which claims priority to Japanese Patent Application No. 2002-168268, filed Jun. 10, 2002, and which international application is herein incorporated by reference.

FIELD OF THE INVENTION

The present invention relates to a method of synthesizing mesoporous zeolite, which has a pore structure in a meso order (6–10 nm) with a relatively large specific surface area, useful as functional materials such as catalysts and adsorbents.

DESCRIPTION OF THE RELATED ART

Zeolite has been used in various fields, e.g. catalytic decomposition or hydrogenation of hydrocarbons, catalytic decomposition or substitution of toxic gases and selective adsorption of certain gaseous components. Zeolite is a microporous aluminosilicate crystal, which involves micropores of 1 nm or less in size. Due to its high crystallinity in addition to the pore size, molecules hardly come in contact with zeolite. If the morphology of zeolite is so moderated to facilitate invasion of molecules into the pores, an increase of a reaction rate is expected, resulting in efficient reaction or adsorption.

Synthesis of zeolite with a mesoporous structure has been researched so far, in order to facilitate concentration of adsorbed molecules or invasion of molecules into micropores without damage of the morphology. Processing with an alkali is reported by Ogura et al., Chem. Lett. (2000) 882, and Suzuki & Okuhara, Microporous Mesoporous Mater., 49, 83 (2001), whereby a zeolite crystal is processed with an alkali for dissolution of silicic components so as to leave traces of the silicic components as mesopores therein.

The mesoporous zeolite, which is prepared by the alkali-processing, degrades its crystallinity and physical strength due to vanishment of silicic components. The vanishment of silicic components also means change of chemical properties of zeolite, i.e. damage of intrinsic characteristics of zeolite.

Another synthesis method is proposed by JP 2001-163699A, wherein carbon black is used as a template. However, carbon black has a small specific surface area and a size distribution within a broad range of from a several nanometers to hundreds nanometers, so that a synthetic zeolite crystal has a pore structure heterogeneous as a whole, although mesopores of tens nanometers in size are observed by an electron microscopy.

SUMMARY OF THE INVENTION

The present invention aims at provision of a mesoporous zeolite crystal, which involves mesopores of 6–12 nm in size and has a relatively large specific surface area with good crystallinity. The mesopore structure of zeolite is realized by use of a mesospace, which is defined by spheroidal particles of carbon aerogel, as a template. The inventive method does not need such extrusion of some components from zeolite as in the alkali-processing, so that the synthesis product maintains intrinsic characteristics of zeolite.

According to the present invention, carbon aerogel, which is prepared from carbonaceous gel by heat-treatment in a supercritical carbon dioxide atmosphere at a temperature higher than a critical temperature of carbon dioxide and then carbonization in a non-oxidizing atmosphere such as nitrogen, is used as a template. The carbon aerogel is mixed with raw materials, i.e. silicic and aluminum sources, for synthesis of zeolite. A reaction accelerator-containing liquid is added to the mixture to prepare an aqueous solution. The aqueous solution is subjected to hydrothermal reaction for synthesis of zeolite. A reaction product is washed, dried and then heat-treated for extrusion of carbon as gases from the synthetic zeolite.

The reaction accelerator may be an alkali such as sodium hydroxide or tetramethylammonium hydroxide. Co-presence of such an additive as tetrapropylammonium bromide or tetramethylammonium hydroxide, which also serves as a template and inhibits invasion of Al, is preferable for synthesis of a zeolite crystal, which has a pore structure good of crystallinity with a high Si/Al ratio.

DETAILED DESCRIPTION OF THE PREFERRED EMBODIMENTS

Figure 1:
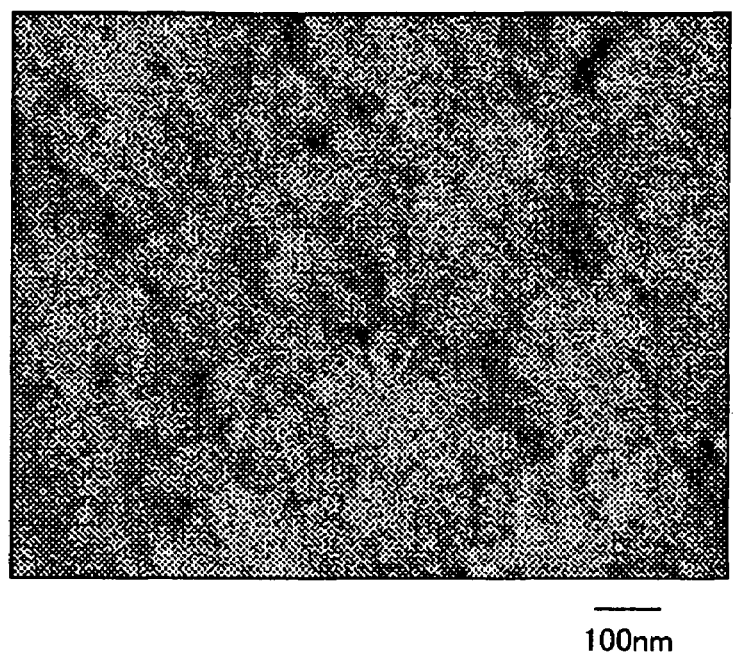
FIG. 1 is a FE-SEM (Field Emission Scanning Electron Microscope) image showing a morphology of synthetic zeolite.

The inventors have carried out researches experiments for improvement, characterization and functionality of porous carbonaceous material such as activated carbons for a long term. In the course of the researches, the inventors proposed a synthesis method for production of carbon aerogel, which comprises uniform spheroidal particles of 20–30 nm in size substantially free of micropores. According to the proposed method, the carbon aerogel is produced as follows:

At first, gel is prepared from a mixture of resorcinol with formaldehyde by heat polymerization. The gel is processed with trifluoroacetate and mechanically crushed to particles. Thereafter, the particles are dehydrated with acetone, dried to carbon aerogel in a supercritical carbon dioxide atmosphere and then carbonized in a non-oxidizing atmosphere such as nitrogen.

The carbon aerogel is promising material, which will be applied to various industrial fields due to its peculiar morphology. The present invention is a fruit of the studies on application and development of the carbon aerogel. The peculiar morphology of the carbon aerogel is an effective template for synthesis of a zeolite crystal with a mesopore structure.

Since the carbon aerogel is a coalescence of fine particles with size distribution extremely narrower than carbon black, there are many pores among the coalescent particles. Its specific surface area is remarkably larger, e.g. thousands or hundreds $m^2/g$. Due to the characteristics of the carbon aerogel, a zeolite crystal, which is synthesized in a template of the carbon aerogel, has a homogeneous mesopore structure, which corresponds to cavities defined by spheroidal particles of the carbon aerogel, with a large specific surface area.

Raw materials for synthesis of zeolite are silicic and aluminum sources. The silicic source may be tetraethyl orthosilicate, water glass or silica gel. The aluminum source may be aluminum isopropoxide, aluminum sulphate, aluminum nitrate or sodium aluminate. The silicic and aluminum sources are mixed together, and then a mixed liquor, which dissolves an alkali, e.g. sodium hydroxide, and a template, e.g. tetrapropylammomium bromide, is dropped and dispersed in the silicic/aluminum mixture. As a result, zeolite is synthesized according to a reaction of $93SiO_2+3/2Al_2O_3 \cdot H_2O+3NaOH+13H_2O \rightarrow Na_3Al_3Si_{93}O_{192} \cdot 16H_2O$.

Zeolite is synthesized in co-presence of carbon aerogel, by mixing the carbon aerogel with the silicic and aluminum sources, putting the mixture in a pressure-resistant vessel and subjecting the mixture to hydrothermal reaction. During the synthesis, cavities among spheroidal particles of the carbon aerogel are filled with a reaction product, i.e. zeolite. The spheroidal particles of the carbon aerogel are solid particles with narrow size distribution of 20–30 nm, which are substantially nonporous and nonreactive to zeolite, so that synthetic zeolite uniformly spreads to all the cavities among the spheroidal particles. In this meaning, the carbon aerogel is an effective template, which transcribes its morphology to the synthetic zeolite with good reproducibility.

A temperature for the hydrothermal reaction is preferably held within a range of 100–200° C. for efficient synthesis of zeolite from silicic and aluminum sources. Since a reaction rate decreases as falling of a reaction temperature, a reaction temperature of 100° C. or higher is desirable for completion of synthesis in a practical time. But a temperature higher than 200° C. causes violent hydrothermal reaction inappropriate for synthesis of a homogeneous zeolite crystal. An atmospheric pressure during the hydrothermal reaction is determined in relation with the reaction temperature. For instance, the atmospheric pressure is controlled to 5065 hPa (5 atm.) at 150° C. or to 15195 hPa (15 atm.) at 200° C. Since crystallinity of the synthetic zeolite becomes better as prolongation of a reaction time, the hydrothermal reaction is preferably continued for a week or a month.

After synthesis of objective zeolite, the reaction product is subjected to repetition of washing and boiling for removal of a surplus solution. The reaction product is then washed with ethanol to extrude un-reacted silicic and aluminum sources from the carbon aerogel. Thereafter, the washed carbon aerogel is heated and dried.

When the carbon aerogel, which involves the synthetic zeolite in its cavities, is calcined at a high temperature in an oxidizing atmosphere, the carbon aerogel oxidatively vanishes. The vanishment of the carbon aerogel does not lead to deformation of the synthetic zeolite at an interface in contact with the carbon aerogel, since the carbon aerogel is non-reactive to the zeolite. Accordingly, the pore structure of the carbon aerogel is accurately transcribed to the synthetic zeolite, resulting in formation of a mesopore structure corresponding to cavities defined by spheroidal particles of the carbon aerogel.

During calcination, the carbon aerogel impregnated with the synthetic zeolite is heated at a temperature of 500° C. or higher in an oxidizing atmosphere so as to promote oxidative vanishment of the carbon aerogel. If the impregnated carbon aerogel is heated at a temperature lower than 500° C., it is insufficiently oxidized and likely to remain as residual carbon in a calcined product. Oxidation of the carbon aerogel is more accelerated as rising of a heating temperature, but an upper limit of the heating temperature is preferably determined at 800° C. for saving energy consumption and industrial applicability.

The synthetic zeolite according to the present invention has a mesopore (e.g. 6–12 nm) structure, which is originated in cavities defined by spheroidal particles of the carbon aerogel, with a relatively large specific surface area. The synthetic zeolite, i.e. a hydrothermal reaction product of a silicic source with an aluminum source, has a good crystallinity and a mesopore structure, which is not expected from known zeolite prepared by alkali-processing to extract silicic components. Therefore, the synthesis product maintains intrinsic properties, e.g. catalytic activity, adsorption-ability, chemical stability and crystallinity, of zeolite itself. Its morphology, wherein mesopores of 6–12 nm in size are uniformly distributed, is also superior to that of zeolite synthesized by use of carbon black as a template. The mesopores with narrow size distribution are effective for rapid concentration of gaseous molecules and catalytic reaction or selective separation of the gaseous molecules.

EXAMPLE

An aqueous solution (25 ml) was prepared by adding 0.0265 g (0.01 M) of $Na_2CO_3$, 2.7528 g (1 M) of resorcinol, 4.058 liters (2 M) of a 37% formaldehyde solution to deionized water. The aqueous solution was poured in a glass vessel, held as such at a room temperature for 24 hours, warmed at 60° C. for 24 hours and further warmed at 80° C. for 48 hours. Dark brown gel was formed in the aqueous solution by the heat-treatment. The gel was poured in a 0.125% trifluoroacetate solution, held as such at a room temperature for 24 hours, and then washed with acetone to extract water from pores of the gel. Thereafter, the gel was received in an autoclave and dried in a supercritical carbon dioxide atmosphere at a temperature higher than a critical temperature under application of a pressure for substitution of acetone with $CO_2$. Finally, the temperature and the pressure were lowered for extrusion of $CO_2$, and the supercritical carbon dioxide atmosphere was replaced by nitrogen to carbonize the gel. As a result, carbon aerogel, which had a pore structure with average mesopore size of 23 nm in absence of solvent molecules, was produced.

A zeolite precursor liquid was prepared by mixing 20833.0 mg of tetraethyl orthosilicate with 204.25 mg of aluminum isopropoxide. A deionized aqueous solution (144 g), which dissolved 400.00 mg of sodium hydroxide and 2662.7 mg of tetrapropylammonium bromide, was dropped and mixed with the zeolite precursor liquid by 0.5 hours-stirring. The aqueous solution, which suspended a reaction product therein, was poured together with the carbon aerogel in a fluororesin vessel and conditioned to a state familiar with the carbon aerogel.

The fluororesin vessel was put in an autoclave and hermetically sealed therein. The zeolite precursor was subjected to hydrothermal reaction by holding the autoclave at 150° C. in an oven for 48 hours. Thereafter, the carbon aerogel, which involved a reaction product (zeolite), was taken out of the fluororesin vessel, washed, boiled and filtered. Washing, boiling and filtration were alternatively repeated, until a filtrate became neutral.

The zeolite-supporting aerogel was washed with ethanol three times to extrude un-reacted tetraethyl orthosilicate and un-reacted aluminum isopropoxide. The carbon aerogel was then dried 3 hours at 110° C. in an open air. The zeolite-supporting aerogel was produced at a yield of 60%.

The zeolite-supporting aerogel was further heated up to 500° C. at a heating rate of 1° C./minute in an air stream, held 18 hours at 500° C. and cooled down to a room temperature. The carbon aerogel was oxidatively decomposed by the heat-treatment, and remaining organisms were also completely decomposed. As a result, a monolithic zeolite crystal free of the carbon aerogel was synthesized at a yield of 55%.

Figure 2:
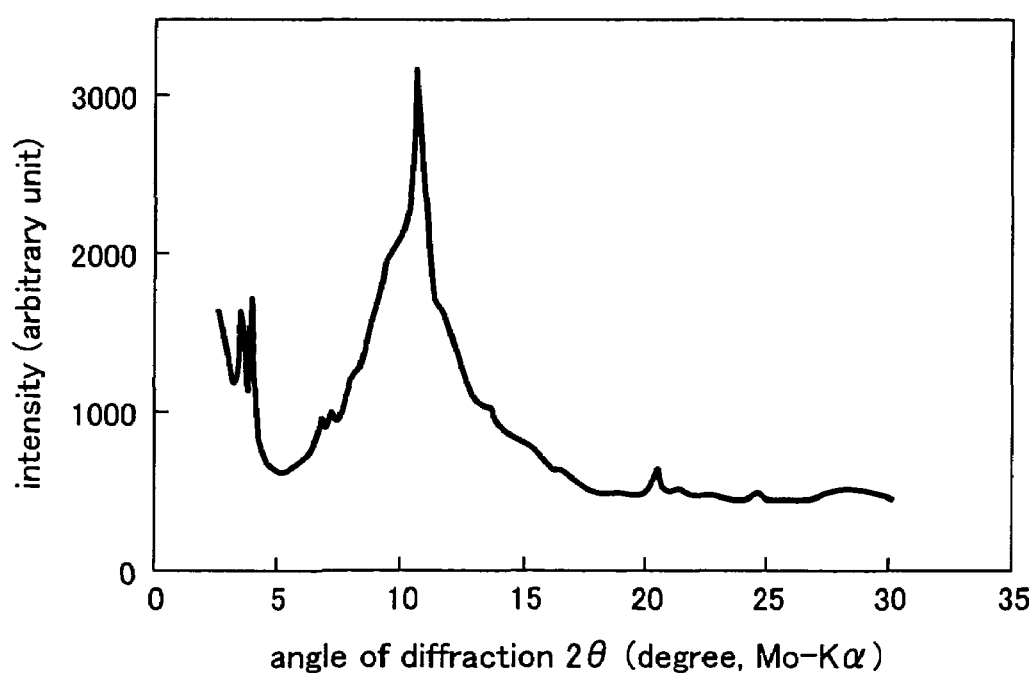
FIG. 2 is a graph of X-ray analysis, which evidences a ZSM-5 morphology of synthetic zeolite.

An FE-SEM image (FIG. 1) proves that the synthetic zeolite had a pore structure, wherein mesopores of 6–12 nm in size were formed with a pattern corresponding to distribution of spheroidal particles of the carbon aerogel. Formation of zeolite ZSM-5 was confirmed by powder X-ray diffraction, as shown in FIG. 2. Since the pore size of the morphology was larger than a molecular size, the mesopores were not blocked with the molecules. Consequently, the mesopore structure is effective for adsorption, desorption or diffusion, and the synthetic zeolite is useful as functional materials with high reactivity.

Figure 3A:
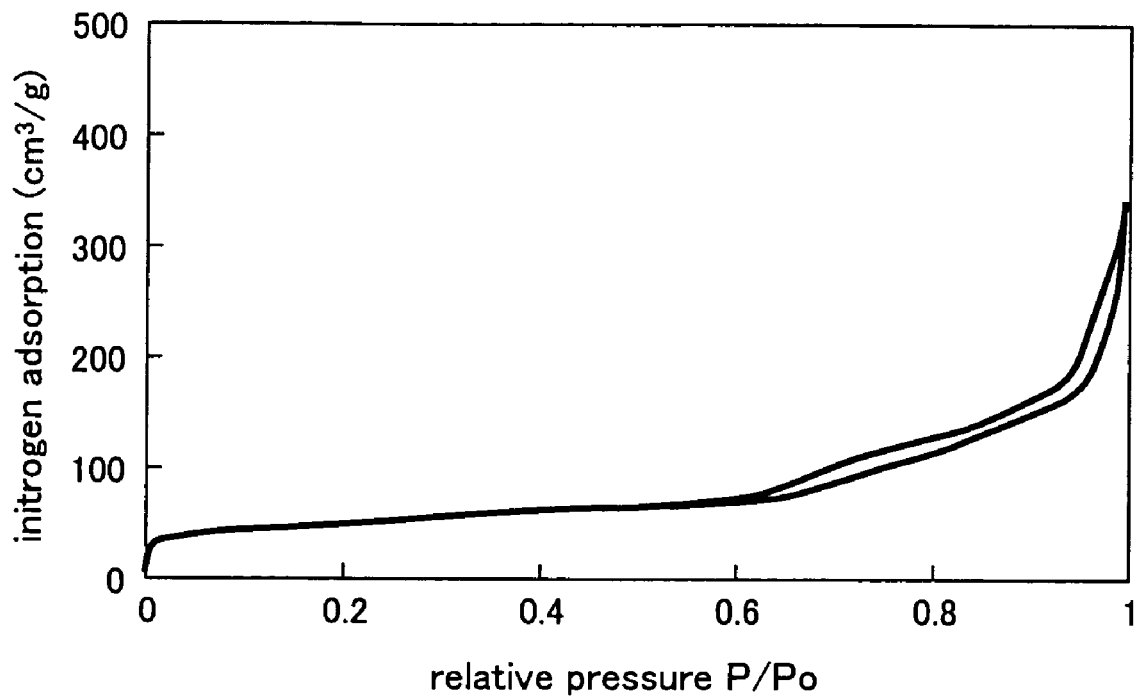
FIG. 3A is a graph showing a nitrogen adsorption isotherm of synthetic zeolite at 77K.
Figure 3B:
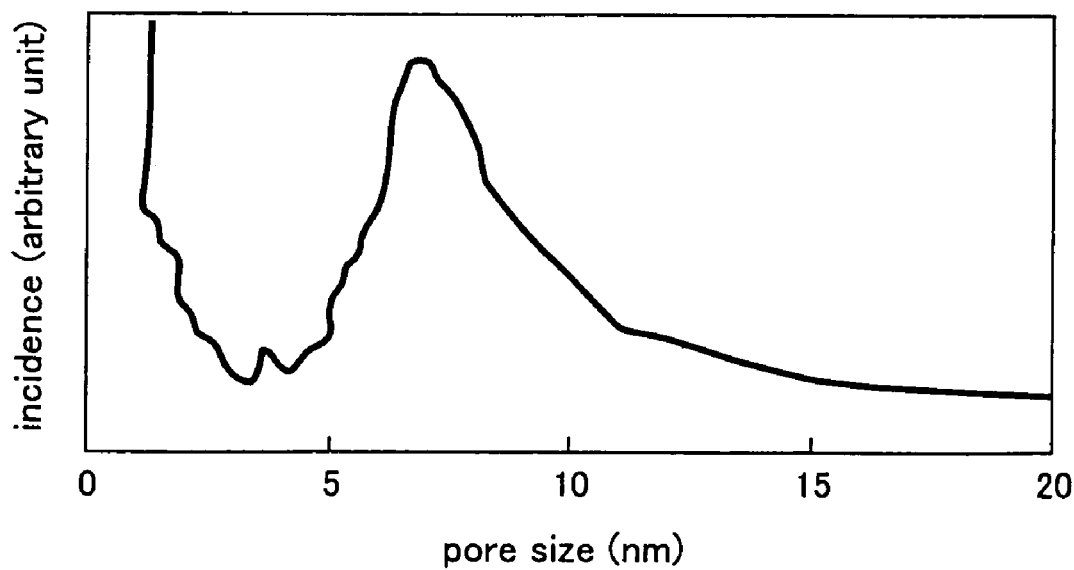
FIG. 3B is a graph showing a pore size distribution of synthetic zeolite.

The synthetic zeolite had a nitrogen adsorption isotherm (77 K), as shown in FIG. 3A, wherein an adsorption hysteresis was clearly noted at a relative pressure of 0.6 or more. The adsorption hysteresis is an evidence of a mesopore structure. Presence of mesopores in the synthetic zeolite is recognized by the observation result that the adsorption hysteresis was noted even at a higher relative pressure.

The adsorption hysteresis was analyzed by Dollimore-Heal's method in order to calculate a pore size distribution curve. It was confirmed from the analysis result that most of pores are within a narrow range of 6–12 nm. Accordingly, the inventive zeolite had a mesopore structure different from conventional crystalline zeolite.

The mesoporous structure with a pore size concentrative within a range of 6–12 nm is apparently distinguished from a mesoporous structure of alkali-processed zeolite with a pore size of 2 nm or so. Such a mesoporous structure can not be realized by zeolite, which is synthesized in carbon black as a template. Furthermore, the new zeolite has a large specific surface area and a ZSM-5 monolith morphology.

The features of the new zeolite are effective for use as functional materials such as catalysts and adsorbents, especially for catalytic reaction or selective adsorption, wherein reactivity or adsorption ability is significantly affected by a molecular adsorption rate. For instance, when conventional ZSM-5 zeolite with a pore size of 0.5 nm or so is used for such catalytic reaction or selective adsorption, molecules gather at opening of micropores and block the micropores, so as to impede invasion of the molecules into the micropores. In case of the new zeolite with a pore size of 6–12 nm, molecules are concentrated at openings of mesopores and gradually fed into the mesopores on the contrary. Since the openings of the mesopores are not blocked with the molecules, an adsorption rate is maintained at a high value. In fact, the new zeolite adsorbs n-nonane (a normal chained alkyl) at an adsorption rate two times or more higher than conventional zeolite.

According to the present invention, zeolite is synthesized by hydrothermal reaction with use of carbon aerogel as a template and then converted to a mesopore structure, wherein traces of spheroidal particles of the carbon aerogel remain as mesopores, by oxidative vanishment of the carbon aerogel. The synthetic zeolite maintains its intrinsic characteristics without damage of crystallinity, as compared with conventional zeolite, which has a mesoporous structure formed by alkali-processing to extrude silicic components. Therefore, the new zeolite is useful as functional materials in various fields, e.g. catalysts and adsorbents, due to the peculiar mesopore structure in addition to the intrinsic characteristics of zeolite.

What is claimed is:

1. A method of synthesizing zeolite with mesopores of 6–12 nm in size, which comprises the steps of:
   providing carbon aerogel, which is prepared from carbonaceous gel by heat-treatment in a supercritical carbon dioxide atmosphere;
   mixing the carbon aerogel with silicic and aluminum sources as raw materials of zeolite;
   adding a solution, which contains a reaction accelerator, to the mixture of the carbon aerogel with the silicic and aluminum sources, to prepare a zeolite precursor solution;
   subjecting the zeolite precursor solution to hydrothermal reaction for synthesis of zeolite;
   washing and drying the reaction product; and then
   heating the dry reaction product to oxidatively extrude the carbon aerogel therefrom.

2. The method defined by claim 1, wherein the carbon aerogel is a coalescence of spheroidal particles of 20–30 nm in size.

3. The method defined by claim 1, wherein the hydrothermal reaction is performed at 100–200° C.

* * * * *